(12) United States Patent
Hernandez et al.

(10) Patent No.: US 9,573,506 B2
(45) Date of Patent: Feb. 21, 2017

(54) FOAMLESS TRAY TABLE

(71) Applicant: Zodiac Seats US LLC, Gainesville, TX (US)

(72) Inventors: Juan Hernandez, Chihuahua Chi (MX); Raul Daniel Flores, Gainesville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 14/895,195

(22) PCT Filed: Jun. 18, 2014

(86) PCT No.: PCT/US2014/042866
§ 371 (c)(1),
(2) Date: Dec. 1, 2015

(87) PCT Pub. No.: WO2014/205032
PCT Pub. Date: Dec. 24, 2014

(65) Prior Publication Data
US 2016/0129821 A1 May 12, 2016

Related U.S. Application Data

(60) Provisional application No. 61/837,301, filed on Jun. 20, 2013.

(51) Int. Cl.
*A47B 39/00* (2006.01)
*B60N 3/00* (2006.01)
(Continued)

(52) U.S. Cl.
CPC ............ *B60N 3/004* (2013.01); *A47B 31/06* (2013.01); *B32B 3/28* (2013.01); *B32B 9/00* (2013.01);
(Continued)

(58) Field of Classification Search
CPC ..... B60N 3/004; B60N 2/242; B64D 11/0638; B32B 3/28; B32B 9/00; B32B 2307/202; B32B 2307/54; B32B 2307/584; B61D 33/0007; A47B 31/06; Y02T 50/46; B65D 2519/00044
(Continued)

(56) References Cited

U.S. PATENT DOCUMENTS 4,507,348 A * 3/1985 Nagata ...................... B32B 3/28
108/57.25
4,879,956 A * 11/1989 Shuert ................ B65D 19/0018
108/52.1
(Continued)

FOREIGN PATENT DOCUMENTS

EP 0423551 A2 4/1991
EP 1223032 A2 7/2002

OTHER PUBLICATIONS

International Patent Application No. PCT/US2014/042866, Search Report and Written Opinion dated Oct. 10, 2014.
(Continued)

*Primary Examiner* — Jose V Chen
(74) *Attorney, Agent, or Firm* — Kilpatrick Townsend & Stockton LLP; Dean W. Russell; Davidson G. Lucas

(57) ABSTRACT

Described are tray table assemblies that include an upper cover, a lower cover, and a support structure disposed between the upper cover and the lower cover. The support structure may include a plurality of upper protrusions extending toward an inner surface of the upper cover and a plurality of lower protrusions extending toward an inner surface of the lower cover such that the support structure provides structural rigidity to the tray table assembly. The plurality of upper protrusions may contact the inner surface of the upper cover, the plurality of lower protrusions may
(Continued)

contact the inner surface of the lower cover, and the support structure may dissipate heat.

20 Claims, 7 Drawing Sheets

(51) Int. Cl.
| | | |
|---|---|---|
| *B32B 3/28* | (2006.01) | |
| *B64D 11/06* | (2006.01) | |
| *A47B 31/06* | (2006.01) | |
| *B32B 9/00* | (2006.01) | |
| *B60N 2/24* | (2006.01) | |
| *B61D 33/00* | (2006.01) | |

(52) U.S. Cl.
CPC ........... *B60N 2/242* (2013.01); *B61D 33/0007* (2013.01); *B64D 11/0638* (2014.12); *B32B 2307/202* (2013.01); *B32B 2307/54* (2013.01); *B32B 2307/584* (2013.01); *Y02T 50/46* (2013.01)

(58) Field of Classification Search
USPC .......... 297/163; 108/57.25, 901, 902, 57.18, 108/57.26, 57.27, 57.34, 165
See application file for complete search history.

(56) References Cited

U.S. PATENT DOCUMENTS

| | | | | |
|---|---|---|---|---|
| 6,530,330 | B2* | 3/2003 | Sepe | A47B 96/205 108/44 |
| 6,745,703 | B2* | 6/2004 | Torrey | B65D 19/0012 108/51.11 |
| 6,758,518 | B2* | 7/2004 | Ingram | B60N 3/004 108/44 |
| 8,191,486 | B2* | 6/2012 | Apps | B65D 19/0018 108/53.3 |
| 9,376,047 | B2* | 6/2016 | Ulbrich-Gasparevic | B60N 3/004 |
| 2007/0116991 | A1 | 5/2007 | Balthes et al. | |
| 2010/0224102 | A1 | 9/2010 | Allgood | |
| 2013/0169009 | A1* | 7/2013 | Petersen | B60N 3/004 297/163 |
| 2014/0292042 | A1* | 10/2014 | Stewart | B60N 3/004 297/163 |

OTHER PUBLICATIONS

International Patent Application No. PCT/US2014/042866, International Preliminary Report on Patentability dated Dec. 30, 2015.

* cited by examiner

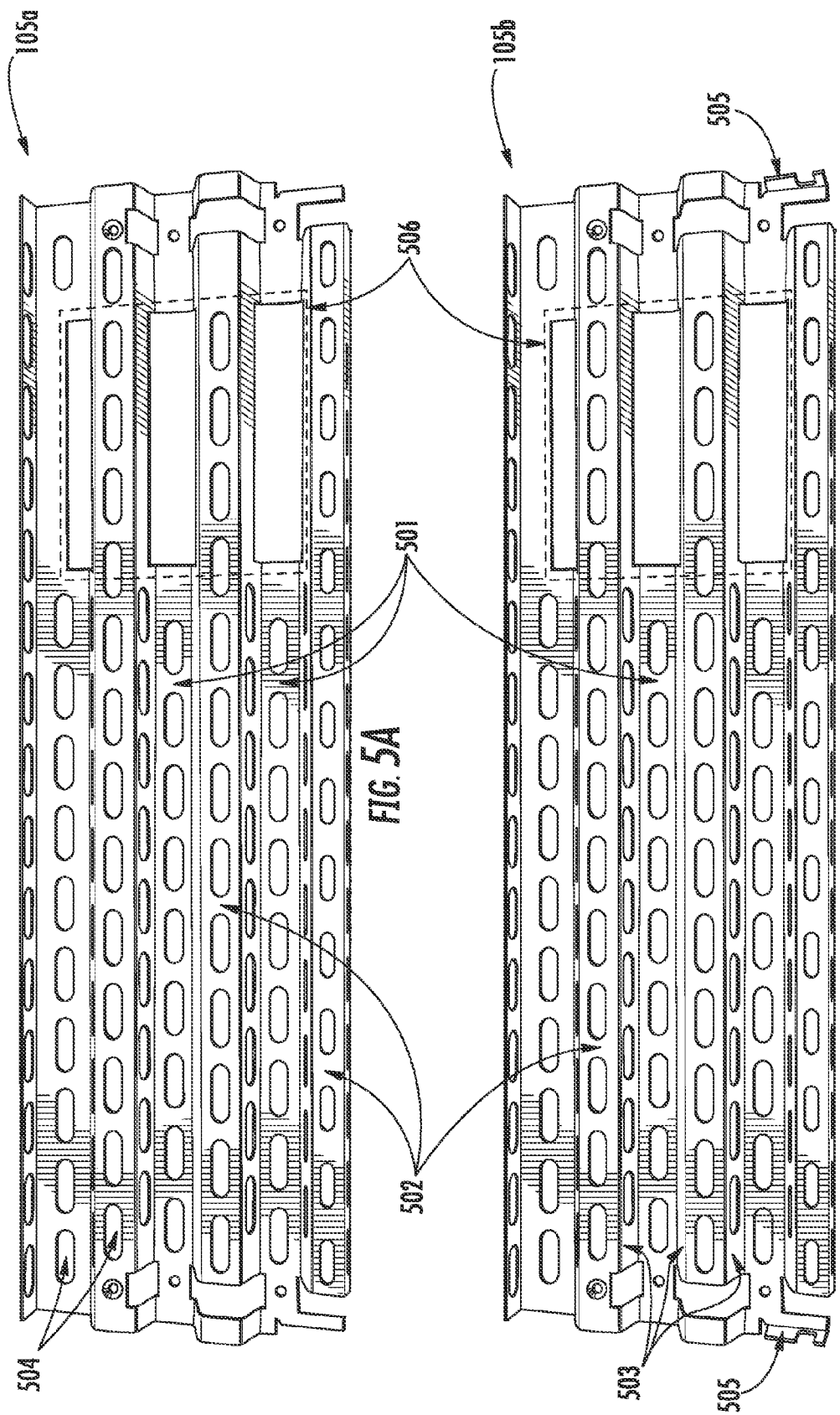

FOAMLESS TRAY TABLE

CROSS REFERENCE TO RELATED APPLICATIONS

This application is the U.S. national phase entry of International Patent Application Serial No. PCT/US2014/042866 ("the '866 application"), filed on Jun. 18, 2014, which application is related to and claims priority benefits from U.S. Provisional Application Ser. No. 61/837,301 ("the '301 application"), filed on Jun. 20, 2013, entitled SHEET METAL FOOD TABLE. The '866 and '301 applications are hereby incorporated in their entireties by this reference.

FIELD OF THE INVENTION

The field of the invention relates to passenger seats or the like and more particularly to tray tables for use with passenger seats.

BACKGROUND

Many passenger seats such as those on passenger aircraft, buses, trains, and the like are arranged so that each passenger seat, other than the forward-most located passenger seats, faces the back of the next forward passenger seat. To increase a passenger's comfort, many passenger seat backs rotate between upright and reclined positions.

In some instances, a tray table may be mounted adjacent the back of each passenger seat for use by a passenger in the next aft passenger seat. The tray table is deployed by the passenger to provide a relatively flat surface for eating, working, recreation, or other uses.

In many conventional uses, the tray table may be mounted to the back of each passenger seat via a pair of retractable arms that allow the tray table to be pulled toward the passenger when deployed.

As shown in FIGS. 4A-4C, in a conventional configuration, a tray table 400 includes barrier layers as the upper 401 and lower 402 outer layers. Between the barrier layers 401 and 402, the tray table 400 also includes filler material 403, plastic supports 404, and a heat exchanger 405. The filler material may be, for example, an injected polyurethane foam material. There are numerous manufacturing concerns and problems related to foam including, for example, (1) significant scrap rates (leading to increases in manufacturing time and raw material cost), (2) extended manufacturing cycle times (due to curing, cooling, and inspecting the foam), (3) excess infrastructure and machine resources for both physical space and machine costs (e.g., foam manufacturing may require foam machines, ovens, cleaning stations, spray booth stations, mold racks, and molds), (4) increased human capital and labor costs, (5) high inspection failure rates due to delamination and/or warpage, (6) issues related to certification, and (7) health concerns.

To the extent the aforementioned problems are related to foam (i.e., filler material 403), these problems are eliminated by the current invention. The exploded assembly shown in FIG. 4C includes four components (filler material 403, two plastic supports 404, and a heat exchanger 405) that can all be replaced by a single support structure 105 (described in more detail below). In certain cases, replacing this group of components with support structure 105 results in (1) a raw material cost savings of more than $2 for every tray table assembly and/or (2) more than 20% reduction in weight compared to the group of components described above.

In certain situations, it may be desirable to eliminate filler material from tray tables to increase manufacturing efficiency and to reduce costs, while also providing a lightweight and durable tray table.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table assembly comprises an upper cover, a lower cover, and a support structure disposed between the upper cover and the lower cover. The support structure may include a plurality of upper protrusions extending toward an inner surface of the upper cover and a plurality of lower protrusions extending toward an inner surface of the lower cover such that the support structure provides structural rigidity to the tray table assembly. In some embodiments, the plurality of upper protrusions contact the inner surface of the upper cover, the plurality of lower protrusions contact the inner surface of the lower cover, and the support structure dissipates heat.

In some embodiments, the support structure comprises a plurality of holes.

The plurality of upper protrusions and the plurality of lower protrusions, in certain embodiments, extend parallel to each other along a first direction of the tray table assembly.

The upper cover, in some embodiments, comprises an indentation. In certain embodiments, a portion of one or more of the plurality of upper protrusions are removed in an area corresponding to the indentation.

In some embodiments, the support structure includes one or more upstanding tabs extending from one of the plurality of upper protrusions toward the plurality of lower protrusions.

The plurality of upper protrusions, in certain embodiments, contact approximately half of the inner surface of the upper cover and the plurality of lower protrusions contact approximately half of the inner surface of the lower cover.

In certain embodiments of the present invention, a passenger seat may include a tray table assembly that comprises an upper cover, a lower cover, and a support structure disposed between the upper cover and the lower cover. The support structure may include a plurality of upper protrusions extending toward an inner surface of the upper cover and a plurality of lower protrusions extending toward an inner surface of the lower cover such that the support structure provides structural rigidity to the tray table assembly. In some embodiments, the plurality of upper protrusions contact the inner surface of the upper cover, the plurality of lower protrusions contact the inner surface of the lower cover, and the support structure dissipates heat.

In some embodiments, the support structure comprises a plurality of holes.

The plurality of upper protrusions and the plurality of lower protrusions, in certain embodiments, extend parallel to each other along a first direction of the tray table assembly.

The upper cover, in some embodiments, comprises an indentation. In certain embodiments, a portion of one or more of the plurality of upper protrusions are removed in an area corresponding to the indentation.

In some embodiments, the support structure includes one or more upstanding tabs extending from one of the plurality of upper protrusions toward the plurality of lower protrusions.

The plurality of upper protrusions, in certain embodiments, contact approximately half of the inner surface of the upper cover and the plurality of lower protrusions contact approximately half of the inner surface of the lower cover.

According to certain embodiments of the present invention, a method of manufacturing a tray table assembly comprises forming an upper cover, forming a lower cover, punching a flat component to form the outer shape of a support structure, pressing the support structure to form a plurality of upper protrusions and a plurality of lower protrusions, and mounting the support structure between the upper cover and the lower cover such that the upper protrusions extend toward the upper cover and the lower protrusions extend toward the lower cover. The support structure may be configured to provide structural rigidity to the tray table assembly. In some embodiments, the plurality of upper protrusions contact the inner surface of the upper cover, the plurality of lower protrusions contact the inner surface of the lower cover, and the support structure dissipates heat.

In some embodiments, the punching step further comprises punching a plurality of holes in the support structure. The plurality of upper protrusions and the plurality of lower protrusions, in certain embodiments, extend parallel to each other along a first direction of the tray table assembly. The method further comprises, in some embodiments, forming an indentation in the upper cover. In certain embodiments, the method further comprises removing a portion of some of the plurality of upper protrusions of the support structure in an area corresponding to the indentation. In some embodiments, the support structure includes one or more upstanding tabs extending from one of the plurality of upper protrusions toward the plurality of lower protrusions. The plurality of upper protrusions, in certain embodiments, attach to approximately half of the inner surface of the upper cover, and the plurality of lower protrusions, in some embodiments, attach to approximately half of the inner surface of the lower cover.

BRIEF DESCRIPTION OF THE DRAWINGS

FIGS. 5A and 5B show bottom views of two embodiments of a support structure of the tray table assembly of FIG. 1.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a tray table assembly for passenger seats. While embodiments of the tray table assembly are discussed for use with aircraft seats, they are by no means so limited. Rather, embodiments of the tray table assembly may be used in passenger seats or other seats of any type or otherwise as desired.

Tray Table Assembly

Figure 1:
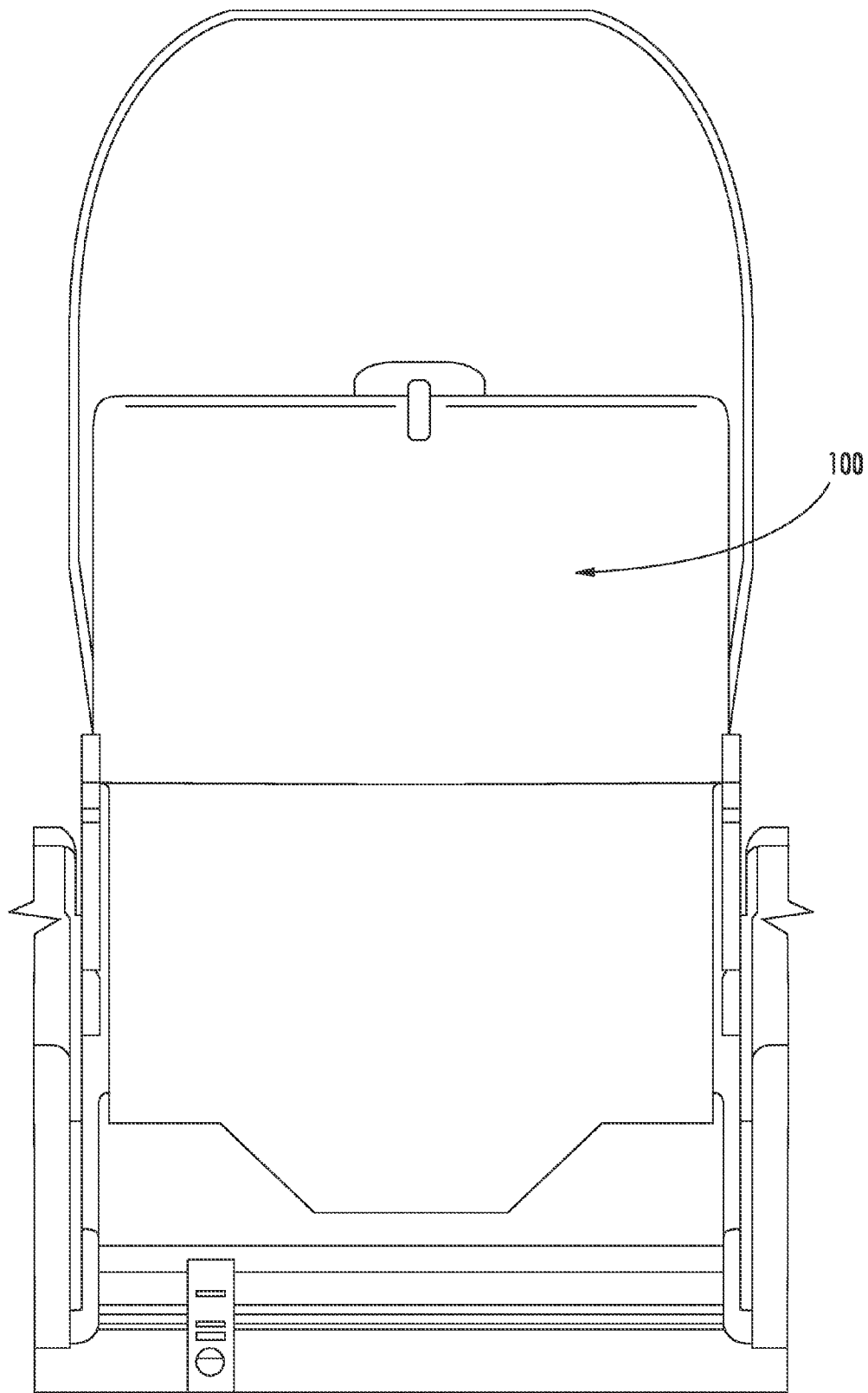
FIG. 1 is a rear view of a passenger seat with a tray table assembly in a stowed position, according to certain embodiments of the present invention.
Figure 2:
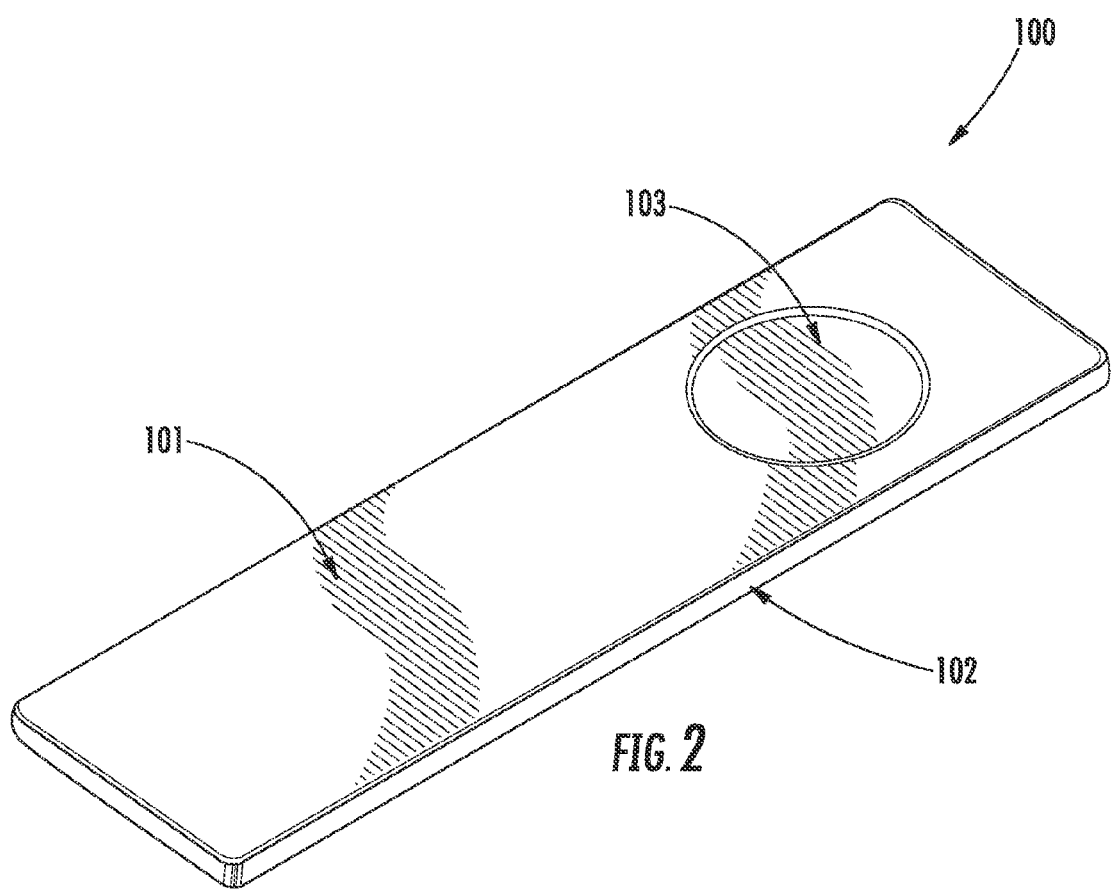
FIG. 2 is an upper perspective view of the tray table assembly of FIG. 1.
Figure 3:
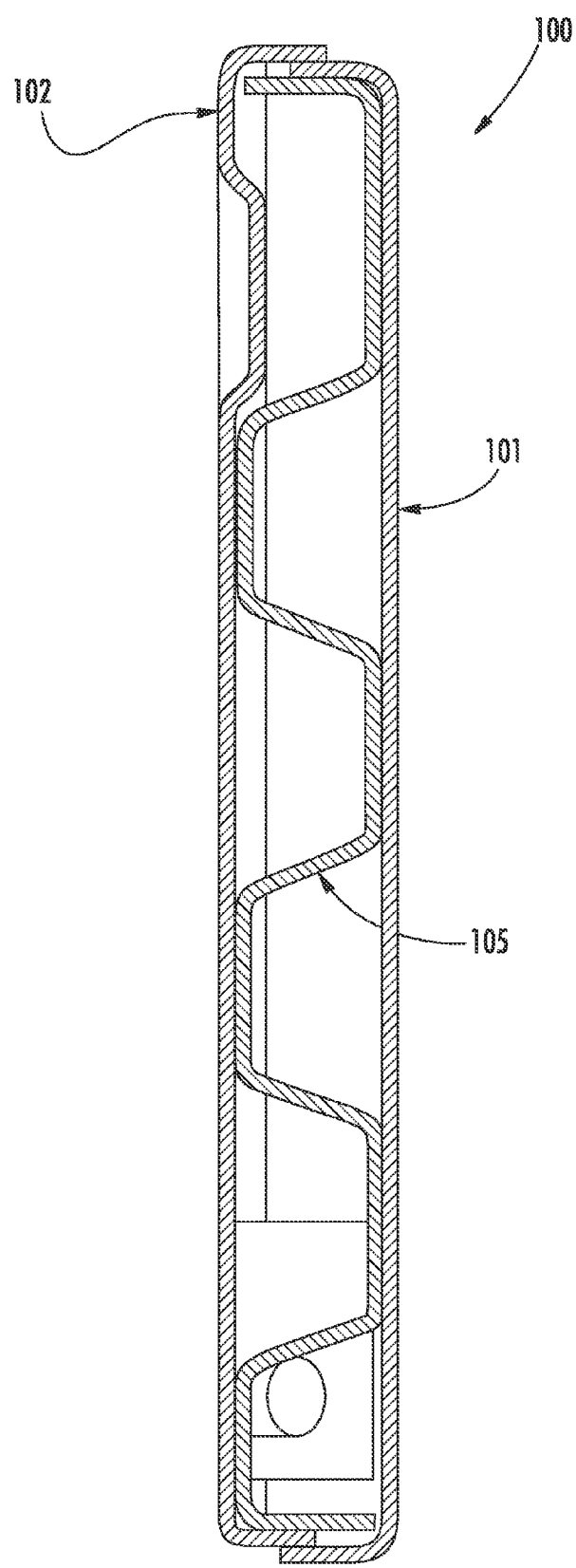
FIG. 3 is a cross-sectional view of the tray table assembly of FIG. 1.
Figure 4B:
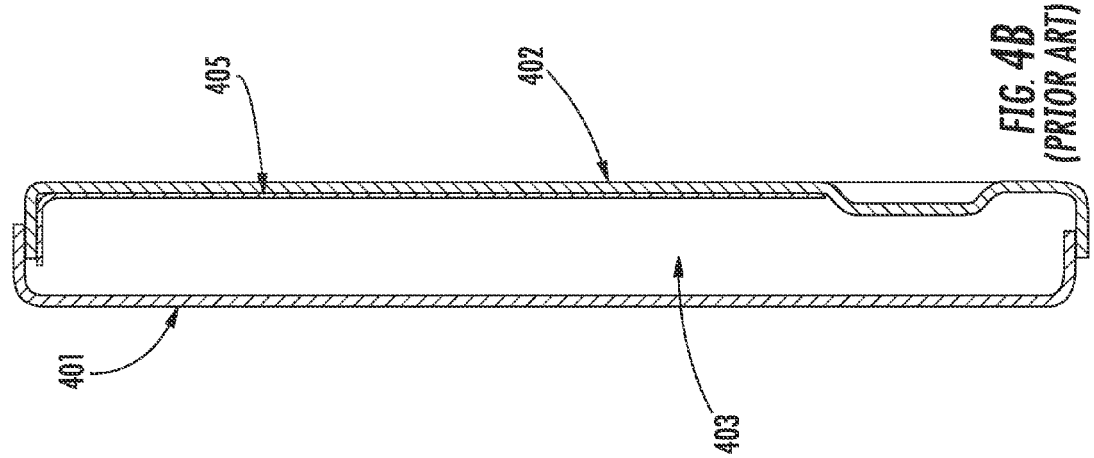
FIG. 4B is a cross-sectional view of the conventional tray table assembly of FIG. 4A.
Figure 4A:
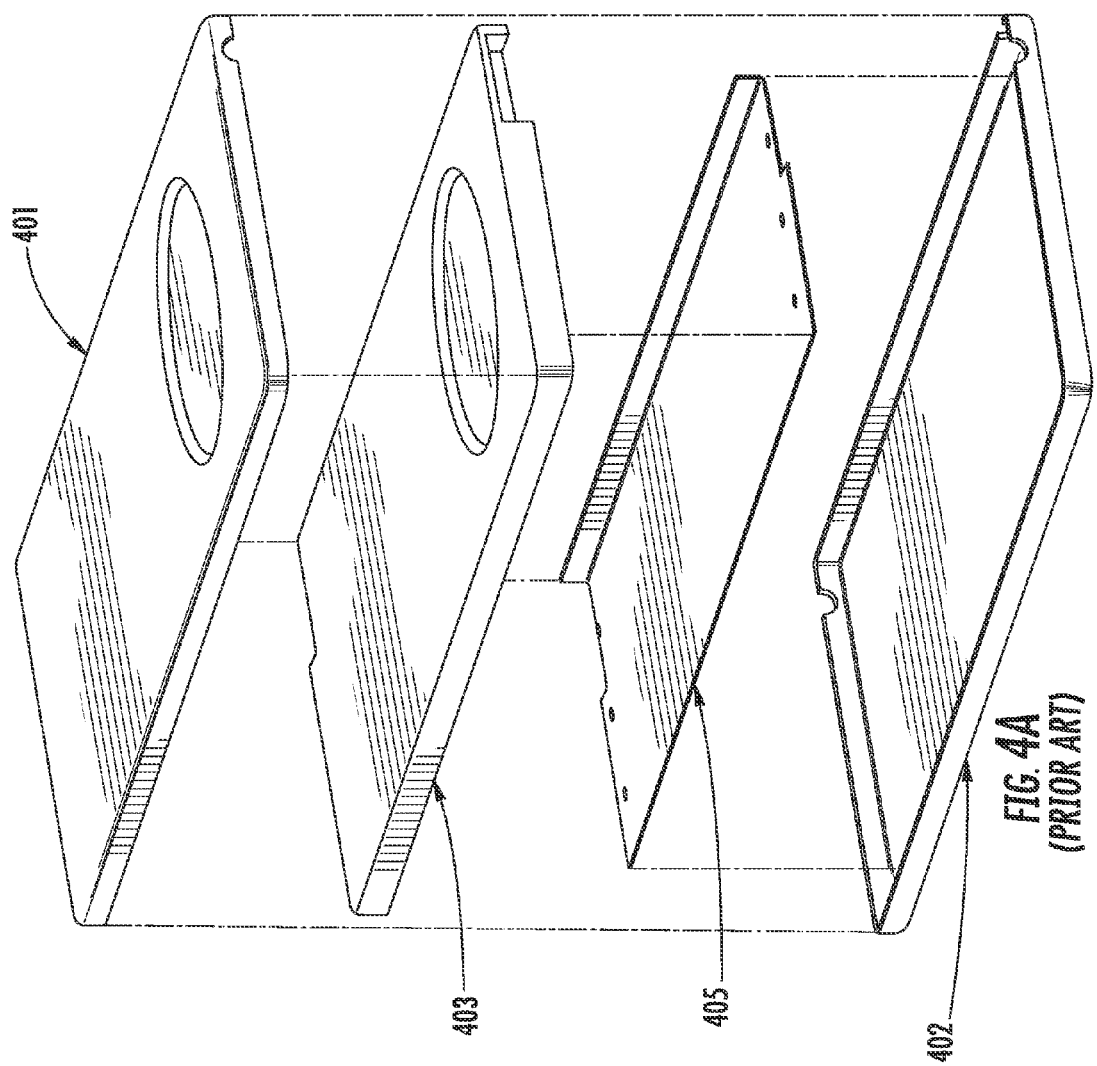
FIG. 4A is an exploded view of the conventional tray table assembly of FIG. 4A.
Figure 4C:
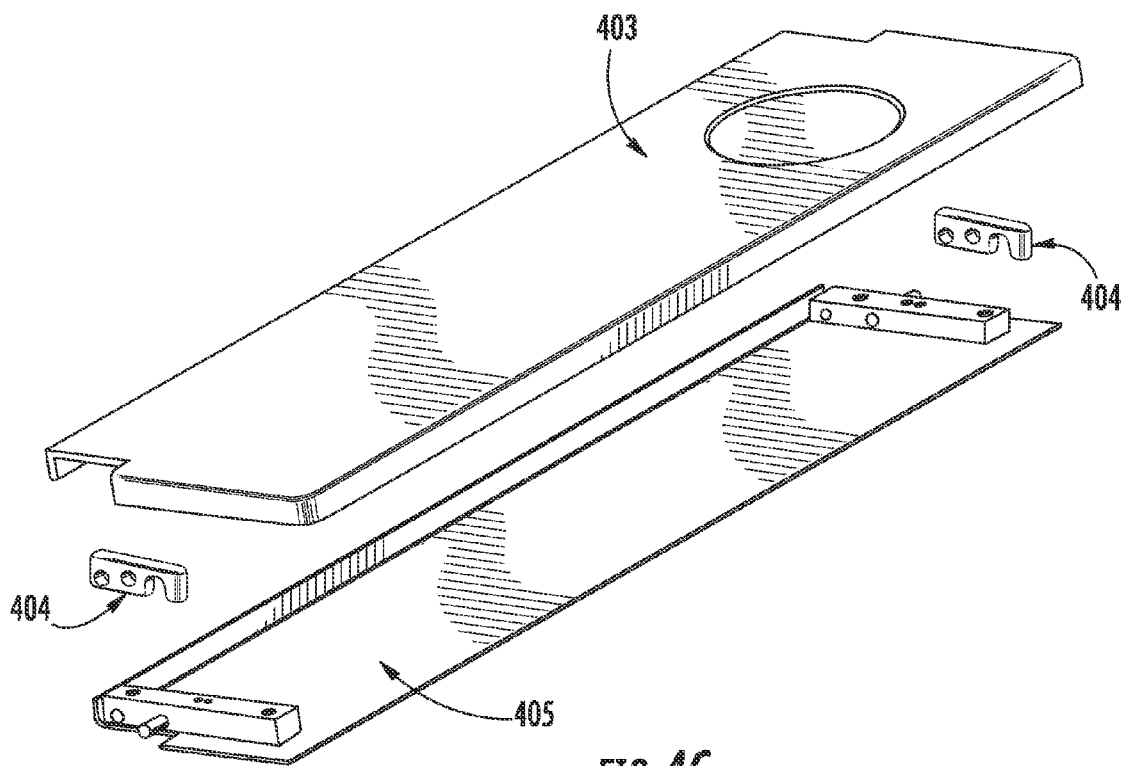
FIG. 4C is a partial exploded view of the conventional tray table assembly of FIG. 4A.

According to certain embodiments of the present invention, as shown in FIGS. 1-3, a tray table assembly 100 may include an upper cover 101, a lower cover 102, and a support structure 105 disposed between the upper cover 101 and the lower cover 102.

In some embodiments, the upper and lower covers 101 and 102 may be formed of materials including, but not limited to, aluminum, stainless steel, aramid fibers, polycarbonate, polypropylene, other metallic materials, composite materials, plastic, thermoplastic, or other similar materials. In certain embodiments, as shown in FIGS. 2 and 3, both the upper cover 101 and the lower cover 102 may include a relatively flat central portion with an upstanding flange at or near at least one edge thereof. When the covers are assembled, in some embodiments, the upstanding flanges may abut or overlap one another.

The support structure 105, in certain embodiments, is disposed between the upper cover 101 and the lower cover 102. The support structure 105 may be formed of materials including, but not limited to, aluminum, stainless steel, aramid fibers, polycarbonate, polypropylene, other metallic or sheet metal materials, composite materials, any conductive material, or other similar materials. As illustrated in FIGS. 5A and 5B, the support structure 105 may include a plurality of upper protrusions 501 extending toward (and in some embodiments are positioned adjacent to or contact) an inner surface of the upper cover 101 and a plurality of lower protrusions 502 extending toward (and in some embodiments are positioned adjacent to or contact) an inner surface of the lower cover 102 such that the support structure 105 (1) dissipates heat and/or (2) provides structural rigidity to the tray table assembly. In certain embodiments, the upper protrusions 501 may be attached to an inner surface of the upper cover 101 via suitable fasteners, which include, but are not limited to, screws, bolts, rivets or other mechanical or chemical fasteners. In addition, in certain embodiments, the lower protrusions 502 may be attached to an inner surface of the lower cover 102 via suitable fasteners, which include, but are not limited to, screws, bolts, rivets or other mechanical or chemical fasteners. The upper protrusions

501 (and the lower protrusions 502) may include surfaces that are parallel to the respective inner surfaces of the upper and lower covers 101 and 102. The support structure 105 may also include intermediate portions 503 that connect a respective upper protrusion 501 to a respective lower protrusion 502. Based on the structural arrangement, the support structure 105 may provide structural rigidity to the tray table assembly.

As shown in FIGS. 5A and 5B, in some embodiments, the support structure 105 may include a plurality of holes 504 to reduce weight. The holes 504 may be arranged on the upper protrusions 501, the lower protrusions 502, and/or the intermediate portions 503. The holes 504 may be circular, oval shaped, rectilinear, or any suitable geometry.

In some embodiments, as shown in FIGS. 5A and 5B, the support structure 105 is constructed such that the upper and lower protrusions 501 and 502 extend parallel to each other along a first direction of the tray table assembly 100. In some embodiments of this construction, as shown in FIGS. 5A and 5B, elongated surfaces are created on the external surfaces of the upper and lower protrusions 501 and 502. In other embodiments, the upper and lower protrusions 501 and 502 may include shortened external surfaces that do not extend the entire length of the tray table assembly 100 (as a substitute for the elongated surfaces).

As shown in FIG. 2, the upper cover 101 may include an indentation 103. To accommodate the inclusion of the indentation 103, a portion of some of the upper protrusions 501 of the support structure 105 may be removed in an area 506 corresponding to the location of the indentation 103.

In certain embodiments, the support structure 105 includes one or more upstanding tabs 505 that extend from one of the plurality of upper protrusions 501 toward the plurality of lower protrusions 502. As shown in FIG. 5B, some embodiments include two tabs 505. The tabs 505 are configured to facilitate mounting hinge hardware to the tray table assembly 100. FIG. 5B shows certain embodiments of the support structure 105*b* with tabs 505, while FIG. 5A illustrates certain embodiments of the support structure 105*a* without tabs.

Figure 6:
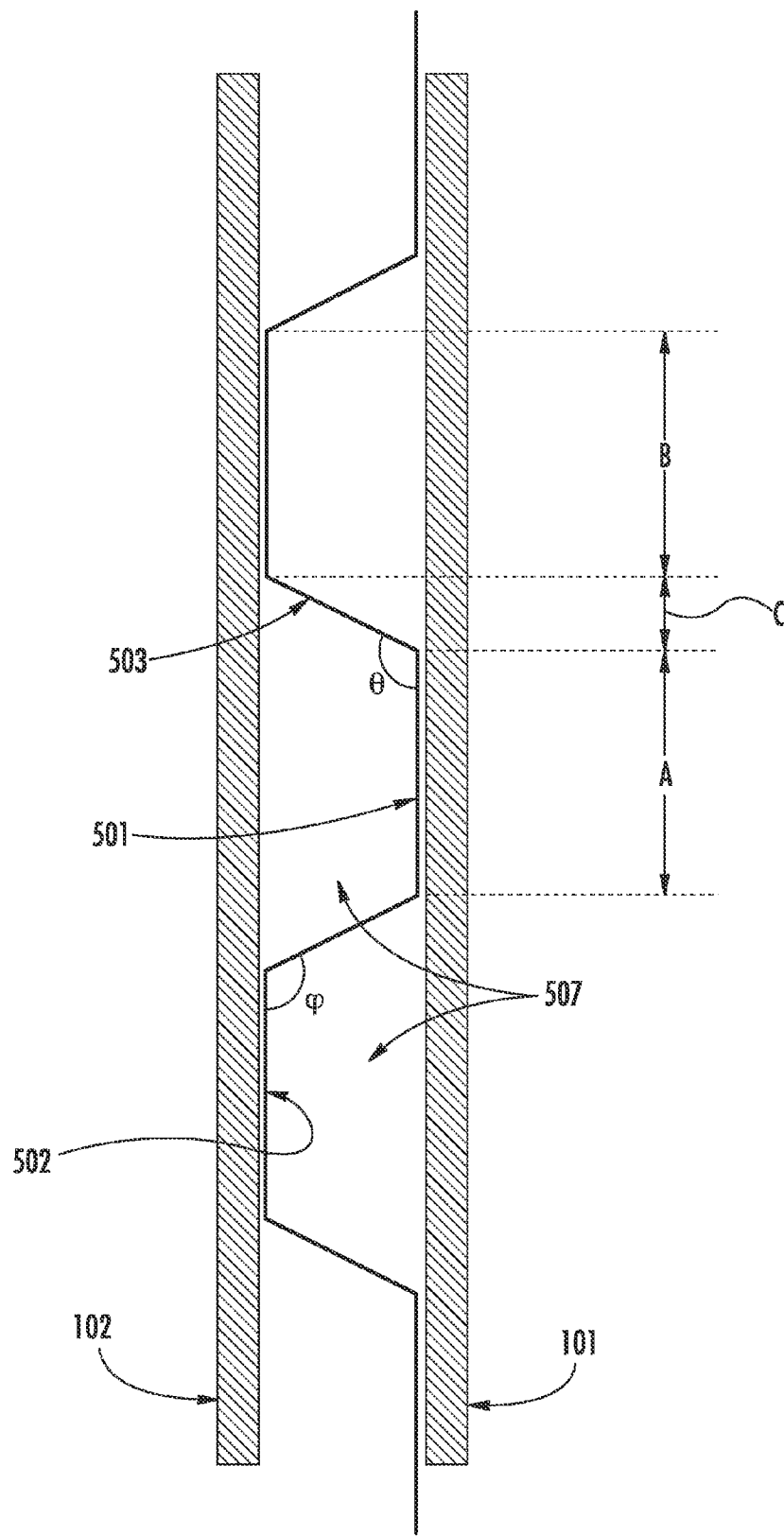
FIG. 6 shows a schematic view of the support structure of FIGS. 5A and 5B.

As discussed above, the support structure 105 may be constructed such that the upper protrusions 501 (and the lower protrusions 502) include elongated outer surfaces that are parallel to the respective inner surfaces of the upper and lower covers 101 and 102. In some embodiments, the elongated outer surfaces are attached to a portion of the respective inner surfaces. The geometric relationship between the upper protrusions 501, the lower protrusions 502, and the intermediate portions 503 defines the amount of the inner surfaces that are adjacent to or contact the upper and lower protrusions 501 and 502. For example, if the upper and lower protrusions 501 and 502 are approximately equally sized and the intermediate portions 503 are approximately perpendicular to the inner surfaces (i.e., the cross-section of the support structure 105 is a square wave), the plurality of upper protrusions 501 will be adjacent to or contact approximately half (50%) of the surface area of the inner surface of the upper cover 101 (and the plurality of lower protrusions 502 will be adjacent to or contact approximately 50% of the surface area of the inner surface of the lower cover 102). In some embodiments, as shown in FIG. 6, in order to minimize material and associated weight for the support structure 105, the angle $\theta$ between the intermediate portion 503 and an upper protrusion 501 may be obtuse. Similarly, the angle $\phi$ between lower protrusions 502 and the intermediate portion 503 may be obtuse. In some embodiments, these angles may be acute. In some embodiments, angle $\theta$ is equal to angle $\phi$. Thus, as shown in FIG. 6, in zone A, upper protrusion 501 may be adjacent to or may contact upper cover 101. In zone B, lower protrusion 502 may be adjacent to or may contact lower cover 102. Between zones A and B, zone C corresponds to the intermediate portion 503 where no part of support structure 105 is adjacent to either upper cover 101 or to lower cover 102. The size of zone C is related to angle $\theta$ and to angle $\phi$. As shown in FIG. 6, even when angle $\theta$ and angle $\phi$ are obtuse, the plurality of upper protrusions 501 may be adjacent to or may contact over one-third and approaching approximately half of the inner surface of the upper cover 101 and the plurality of lower protrusions 502 may be adjacent to or may contact over one-third and approaching approximately half of the inner surface of the lower cover 102.

In addition to the above-described embodiments, a hybrid construction is possible where a structure, such as support structure 105, is combined with a foam material, such as an injected polyurethane foam material, as needed to achieve the desired properties of the tray table assembly 100. In some embodiments, foam material may be added to cavities 507 in between upper and lower covers 101 and 102 where the cavities 507 are defined by the shape of support structure 105. For example, in some embodiments, foam could be added under upper protrusions 501 (and above lower cover 102) and/or above lower protrusions 502 (and under upper cover 101).

Method of Manufacturing Tray Table Assembly

According to certain embodiments of the present invention, a method of manufacturing a tray table assembly 100 may include forming an upper cover 101, forming a lower cover 102, punching a flat sheet metal component to form the outer shape of a support structure 105, pressing the support structure 105 to form a plurality of upper protrusions 501 and a plurality of lower protrusions 502, and mounting the support structure 105 between the upper cover 101 and the lower cover 102 such that the upper protrusions 501 extend toward the upper cover 101 and the lower protrusions 502 extend toward the lower cover 102 such that the support structure 105 provides structural rigidity to the tray table assembly 100.

The support structure 105, in certain embodiments, is configured such that the plurality of upper protrusions 501 are positioned adjacent to or contact the inner surface of the upper cover 101, the plurality of lower protrusions 502 are positioned adjacent to or contact the inner surface of the lower cover 102, and the support structure 105 dissipates heat.

In some embodiments, the punching step may also include punching a plurality of holes in the support structure 105 to reduce weight. As shown in FIGS. 5A and 5B, the support structure 105 may be formed such that the upper and lower protrusions 501 and 502 extend parallel to each other along a first direction of the tray table assembly 100. The step of forming the upper cover 101, as shown in FIG. 2, may include forming an indentation 103 in the upper cover 101. In some embodiments, as shown in FIGS. 5A and 5B, the method may also include removing a portion of some of the upper protrusions 501 of the support structure 105 in an area 506 corresponding to the indentation 103.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and That which is claimed is:

1. A tray table assembly comprising:
an upper cover;
a lower cover; and
a metallic support structure disposed between the upper cover and the lower cover, the metallic support structure comprising a plurality of upper protrusions extending toward an inner surface of the upper cover and a plurality of lower protrusions extending toward an inner surface of the lower cover, wherein:
the metallic support structure provides structural rigidity to the tray table assembly; and
each of the plurality of upper protrusions comprises at least one hole extending therethrough and each of the plurality of lower protrusions comprises at least one hole extending therethrough.

2. The tray table assembly of claim 1, wherein:
the plurality of upper protrusions contact the inner surface of the upper cover;
the plurality of lower protrusions contact the inner surface of the lower cover; and
the metallic support structure dissipates heat.

3. The tray table assembly of claim 2, wherein the plurality of upper protrusions contact approximately half of the inner surface of the upper cover and the plurality of lower protrusions contact approximately half of the inner surface of the lower cover.

4. The tray table assembly of claim 1, wherein the at least one hole extending through the plurality of upper protrusions is oval shaped and the at least one hole extending through the plurality of lower protrusions is oval shaped.

5. The tray table assembly of claim 1, wherein the plurality of upper protrusions and the plurality of lower protrusions extend parallel to each other along a first direction of the tray table assembly.

6. The tray table assembly of claim 1, wherein the upper cover comprises an indentation.

7. The tray table assembly of claim 6, wherein a portion of one or more of the plurality of upper protrusions are removed in an area corresponding to the indentation.

8. The tray table assembly of claim 1, wherein the metallic support structure includes one or more upstanding tabs extending from one of the plurality of upper protrusions toward the plurality of lower protrusions.

9. A passenger seat comprising:
a tray table assembly comprising:
an upper cover;
a lower cover; and
a support structure disposed between the upper cover and the lower cover, the support structure comprising a plurality of upper protrusions extending toward an inner surface of the upper cover, a plurality of lower protrusions extending toward an inner surface of the lower cover, and a plurality of intermediate portions extending between pairs of upper and lower protrusions,
wherein the support structure provides structural rigidity to the tray table assembly; and
each of the plurality of intermediate portions comprises at least one hole extending therethrough, each of the plurality of upper protrusions comprises at least one hole extending therethrough, and each of the plurality of lower protrusions comprises at least one hole extending therethrough.

10. The passenger seat of claim 9, wherein:
the plurality of upper protrusions contact the inner surface of the upper cover;
the plurality of lower protrusions contact the inner surface of the lower cover; and
the support structure is metallic and dissipates heat.

11. The passenger seat of claim 9, wherein:
the at least one hole extending through the plurality of intermediate portions is oval shaped;
the at least one hole extending through the plurality of upper protrusions is oval shaped; and
the at least one hole extending through the plurality of lower protrusions is oval shaped.

12. The passenger seat of claim 9, wherein the plurality of upper protrusions and the plurality of lower protrusions extend parallel to each other along a first direction of the tray table assembly.

13. A method of manufacturing a tray table assembly, the method comprising:
forming an upper cover;
forming a lower cover;
punching a flat component to form an outer shape of a metallic support structure with a plurality of holes therethrough;
pressing the metallic support structure to form a plurality of upper protrusions and a plurality of lower protrusions such that the plurality of holes extend through at least one of the plurality of upper protrusions or the plurality of lower protrusions; and
mounting the metallic support structure between the upper cover and the lower cover such that the plurality of upper protrusions extend toward the upper cover and the plurality of lower protrusions extend toward the lower cover,
wherein the metallic support structure provides structural rigidity to the tray table assembly.

14. The method of claim 13, wherein:
the plurality of upper protrusions contact an inner surface of the upper cover;
the plurality of lower protrusions contact an inner surface of the lower cover; and
the metallic support structure dissipates heat.

15. The method of claim 13, wherein the plurality of holes are oval shaped.

16. The method of claim 13, wherein the plurality of upper protrusions and the plurality of lower protrusions extend parallel to each other along a first direction of the tray table assembly.

17. The method of claim 13, further comprising forming an indentation in the upper cover.

18. The method of claim 17, further comprising removing a portion of some of the plurality of upper protrusions of the metallic support structure in an area corresponding to the indentation.

19. The method of claim 13, wherein the metallic support structure includes one or more upstanding tabs extending from one of the plurality of upper protrusions toward the plurality of lower protrusions.

20. The method of claim 13, wherein the plurality of upper protrusions attach to approximately half of an inner surface of the upper cover and the plurality of lower protrusions attach to approximately half of an inner surface of the lower cover.

* * * * *